United States Patent

[11] 3,619,200

| [72] | Inventors | Kenneth Adie Ferguson<br>West Pennant Hills, New South Wales;<br>David Henry Solomon, Glen Waverley,<br>Victoria, both of Australia |
|---|---|---|
| [21] | Appl. No | 647,522 |
| [22] | Filed | June 20, 1967 |
| [45] | Patented | Nov. 9, 1971 |
| [73] | Assignee | Commonwealth Scientific and Industrial Research Organization<br>East Melbourne, Victoria, Australia |
| [32] | Priorities | May 1, 1967, June 21, 1966 |
| [33] | | Australia |
| [31] | | 21096/67; 7198/66 |

[54] METHOD AND FOOD COMPOSITION FOR FEEDING RUMINANTS
19 Claims, 1 Drawing Fig.

[52] U.S. Cl........................................................ 99/2,
    99/2 G, 99/14, 99/20, 99/166, 424/32
[51] Int. Cl..................................................... A61k 17/00,
    A61k 21/00, A61k 27/00
[50] Field of Search........................................... 99/2, 2 N,
    8, 166, 2 G, 14, 222, 166, 169, 2 R; 117/100;
    167/53; 424/34–37

[56] References Cited
UNITED STATES PATENTS
| 2,560,830 | 7/1951 | Turner | 99/2 |
| 2,680,075 | 1/1954 | Landau | 99/7 |
| 2,768,895 | 10/1956 | Kamlet | 99/2 |
| 3,180,735 | 4/1965 | Titus | 99/2 |
| 3,248,255 | 4/1966 | Belasco et al. | 117/100 |
| 3,248,289 | 4/1966 | Shinozaki et al. | 167/53 |
| 3,265,629 | 8/1966 | Jensen | 99/2 |
| 3,438,780 | 4/1969 | Singer | 99/7 X |
| 3,074,852 | 1/1963 | Mayron | 99/2 X |
| 3,401,039 | 9/1968 | Gordon et al. | 99/2 G |
| 2,682,466 | 6/1954 | Boyer | 99/14 |
| 2,211,961 | 8/1940 | Meigs | 99/14 X |
| 2,934,435 | 4/1960 | Gerard | 99/140 |
| 2,770,571 | 11/1956 | Vance et al. | 424/34 |
| 3,492,398 | 1/1970 | Marco et al. | 424/32 |
| 3,541,204 | 11/1970 | Sibbald et al. | 99/166 |

FOREIGN PATENTS
| 736,192 | 9/1955 | Great Britain | 99/2 |

Primary Examiner—Norman Yudkoff
Assistant Examiner—F. E. Drummond
Attorney—Wenderoth, Lind & Ponack

ABSTRACT: A feed or feed supplement for use in increasing the efficiency of protein production relative to feed intake in ruminants wherein a proteinaceous feed material of plant, animal or synthetic origin is rendered resistant to breakdown within the rumen by chemical modification of the protein and/or the application of a protective coating.

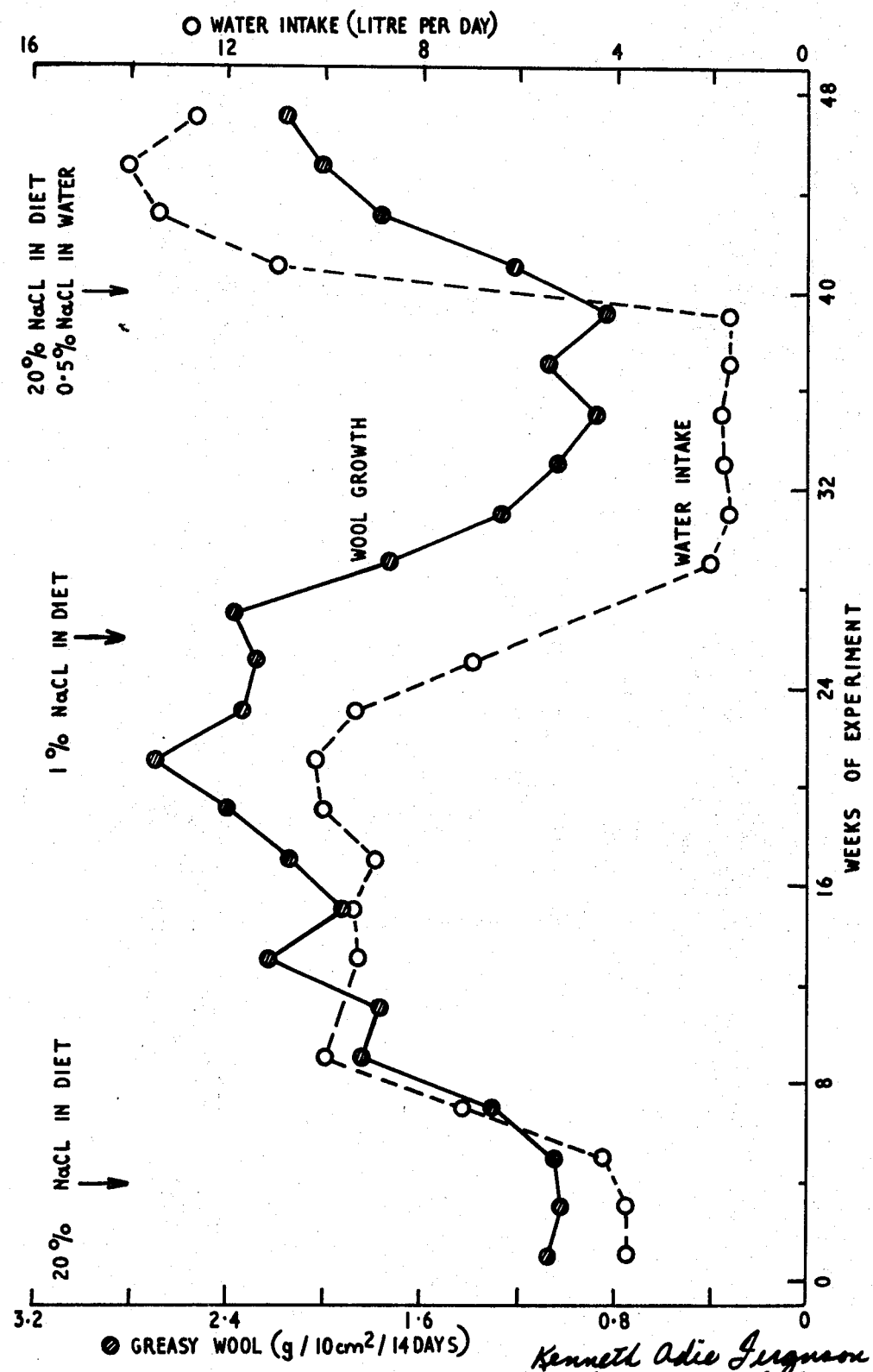

METHOD AND FOOD COMPOSITION FOR FEEDING RUMINANTS

As is well known, wool growth, body growth and meat production, and milk production, require the synthesis of proteins. While wool is almost pure protein, meat and milk contain, in addition to protein, varying proportions of water, fat, carbohydrate and other substances. However, in meat and milk production as in wool production, the synthesis of protein is a limiting step: the process cannot proceed without protein synthesis. Therefore, and in this specification, wool, meat and milk production are referred to generally as protein production. Also, in this specification, the term "proteinaceous" will be applied to single amino acids, polypeptides and amino acid mixtures, as well as to natural proteins.

It is also well known that all proteins found in animals, birds and plants are chemical compounds containing different combinations of some 22 amino acids, the number and arrangement of such acids being fixed in any particular protein. Twelve of these amino acids can be synthesized from other substances by biochemical process normally present in most animals, but the remaining 10—the so-called essential amino acids—cannot be so synthesized and must be ingested by the animal. Since the proportions of the constituent amino acids in a particular protein cannot be varied, the essential amino acid least in supply limits the amount of that protein which can be produced by the animal. Consequently, for any given diet, there will be a particular essential amino acid which limits protein production incorporating that essential amino acid unless, of course, two or more such amino acids are equally limiting.

The appreciation of the above principles has led to the formulation of diets for birds and nonruminant animals which provide the optimum proportion of amino acids and have enabled significant increases in protein production to be achieved. In the ruminant, dietary proteins and amino acids are, to a variable extent, broken down to ammonia by microbial fermentation in the first two compartments of the stomach (the rumen and reticulum). The bacteria and protozoa in these chambers utilize ammonia for their own growth and multiplication and the microbial protein so formed passes on to the abomasum, the compartment of the stomach corresponding to the stomach of nonruminants, where it is partially digested. The process is completed in the small intestine where the amino acids are absorbed.

The amino acid composition of the microbial protein rather than the feed protein determines the proportions of amino acids available to the ruminant. Furthermore, when the protein content of the diet rises above 6–8 percent the microbes in the rumen cannot use the ammonia as quickly as it is formed, and much of it is absorbed and excreted. Thus it was found that increasing the protein percentage of the diet did not increase wool growth, while increasing the total feed intake (which has been shown to increase the amount of microbial synthesis) stimulated wool growth.

Since the proportions of essential amino acids in microbial protein are not similar to the corresponding proportions in meat, milk and wool, it was expected that protein production in ruminants could be increased if the absorption of the limiting essential amino acids could be increased. To provide evidence for this hypothesis P. J. Reis and P. G Schinckel (1961, 1963, 1964) infused the protein casein directly into the abomasum via a tube placed there surgically and observed dramatic increases in wool growth and bodyweight.

Increases were also obtained after the infusion of the amino acids cysteine and methionine. Cysteine (or its other form, cystine), is not an essential amino acid since it can be synthesized in the body from methionine, but it can substitute for methionine as far as the cysteine requirements of the animal are concerned. The feeding of similar amounts of casein in the normal way produced only a small increase in wool growth and bodyweight, while cysteine or methionine were without effect. When cysteine was labeled with radioactive sulfur before being introduced into the rumen, only 3 to 4 percent of the radioactivity was recovered in the wool, most of it appearing in the urine as the sulfate breakdown product. On the other hand, when radioactive cysteine was infused into the abomasum, or injected into the blood stream, as much as 30 to 40 percent of the radioactivity appeared in the wool as cysteine. It is clear from the prior art discussed above that the nutritional value of protein and free amino acids in the feed of ruminants is often depreciated by fermentation in the rumen. The present invention therefore seeks to provide a protein-rich feed or feed supplement for ruminants which can be fed to the animal in the normal way, yet which will produce significant increases in protein production like those reported by Reis and Schinekel (supra) for wool and body growth in the sheep.

From one aspect, therefore, the present invention provides a feed composition or supplement for ruminants comprising proteinaceous feed material of plant, animal or synthetic origin, treated so as to be resistant to breakdown within the rumen. From another aspect, the invention comprises the method of increasing the efficiency of protein production by the ruminant animal by feeding or orally administering to the animal a proteinaceous feed or feed supplement treated so as to render it resistant to attack within the rumen of the animal. Similarly, the invention also comprises, in the manufacture of proteinaceous animal feeds or feed supplements, the step of treating the feed so as to render the protein therein resistant to breakdown within the rumen of the ruminant animal without, at the same time, rendering it indigestible within the abomasum and small intestine.

As indicated above, the choice of natural proteinaceous feed materials is very wide. Thus, it can be a preparation of waste meat, fish meals, caseins or yeast, or other byproducts of the meat industry, dairy industry or fermentation industries. On the other hand, it can include protein-rich plants and preparation such as chaffs, silage, meals, pellets, concentrates or the like formed from grains, nuts, beans and other plant parts, for example lucerne chaff or silage, coconut meal, soya bean meal, peanut meal, linseed meal, cottonseed meal and lucerne leaf meal. More highly purified proteins extracted from the above materials may also be used.

In addition to the above natural proteinaceous materials, amino acids or peptides, either synthetic or derived from proteins, may also be used.

Owing to variable amino acid composition and physical properties the individual proteins will vary greatly in their nutritional value. However, their deficiencies can be made up by the addition of suitable amino acid or peptide preparations.

Through the proteinaceous feeds are preferably of a particulate solid form, they can be prepared as a liquid or paste, or they can be incorporated into a salt block or salt lick. (The preference for the particulate solid form will be explained hereinafter.)

In the great majority of cases, administration of such proteinaceous feedstuffs protected in accordance with the present invention will result in an increase in bodyweight, but the increase is not always pari passu with the increase in wool growth or milk production. This is as expected because of the different amino acid requirements for the synthesis of the different proteins involved. For example, it has been found that abomasal infusions of soya bean meal produce greater increases in bodyweight than similar infusion of fish meal, but that infused fish meal is superior to soya bean meal in respect to wool growth. Thus, one form of protein production can be emphasized with respect to another simply by the choice of a suitable balance of amino acids within the diet. However, in further portraying the nature of the present invention, the illustrative examples will be largely concerned with wool growth and, in this respect, examples 2, 3 and 4 provide a comparison between a variety of feeds prepared by one of the preferred processes to be described.

In producing feeds in accordance with the present invention, it is important to appreciate that for sheep, the residence time within the rumen for normal feedstuffs is about 20 hours, and that the residence time within the abomasum and upper intestine is rarely more than 4 hours, and frequently less than 2; the residence time in other ruminants being similar. That is, the desired protective treatment must be capable of withstanding attack by the digestive enzymes of rumen microflora for 20 hours and yet be so ineffective against the normal digestive enzymes of the abomasum that the amino acids of the proteins can be absorbed during the 2 hours or so that the feed remains in the abomasum and upper intestine. It also should be appreciated that the nutritional system of the ruminant animal is such that in vitro testing of different methods of protecting the feed give only a rough, and sometimes misleading guide to the relative merits of such methods as means for increasing the efficiency of protein production.

Broadly, it is envisaged that the proteinaceous feed can be protected from breakdown within the rumen by the modification of the protein itself, by the application of a protective coating to the feedstuff, or by a combination of both. It is well known that many nutritional proteins can be modified and made more resistant to microbial degradation by heat treatment—that is, by cooking. While such heat treatment can give effective protection against the rumen microflora, it has not been found to be very satisfactory because it is difficult to devise a treatment that will provide the desired protection without substantial impairment of the overall digestibility of the protein, and without loss of essential amino acids.

Similar difficulties have been encountered when attempting to chemically modify proteinaceous feeds. Various treatments analogous to tanning have been tried, but those involving strong metallic tanning agents drastically reduce the overall digestibility of the protein, while treatment with various mild natural vegetable tannins do not appear to give very satisfactory protection in the rumen unless the level of tanning is close to, or above, the toxic. The latter case is illustrated by example 6 below which describes an attempt to use three such vegetable tannins to protect casein from breakdown in sheep rumen.

Investigation of coating substances showed that commercially available slow-release formulations based upon vegetable oils and fats were only able to provide rather limited protection. This was thought to be due, at least in part, to the presence of lipase, or other enzymes, and of surfactants within the rumen capable of breaking down such coatings during the long residence time concerned. On the other hand, these and similar investigations pointed up the difficulty of providing a coating which was reasonably uniform and free of pinholes, and they also emphasized the remarkable ability of the rumen microflora to operate effectively through such pinholes. Nevertheless, it is recognized that the coating formulations and techniques concerned are capable of significant improvement.

However, in view of the above difficulties, and in accordance with a preferred feature of the present invention, it is desirable to take cognizance of the fact that the rumen pH value is usually about 6 (though it can vary between 5 and 7), while the abomasum pH is usually between 2 and 3 (certainly below 4). That is, if the protein is protected by chemical modification, it is most preferable to produce a reaction product which is unstable under acid conditions; or, if the protein is protected by a coating, to employ as the coating a substance which will dissolve or be broken down under the acid conditions of the abomasum. In other words, the surface of the proteinaceous feed particles is preferably rendered substantially less soluble in aqueous solutions having pH values in excess of 5 than in aqueous solutions having pH values less than 4.

Secondly, and in accordance with another important preferred feature of the present invention, it is desirable—when considering coating materials—to employ one which will interact with the protein being protected so that it will effectively spread over the entire surface of a protein particle and thereby substantially reduce the incidence of pinholes. The interaction is preferably by way of weak chemical bonds and/or relatively strong physical adsorption (the two being regarded as practically indistinguishable) and therefore results in the formation of a protective complex of a polymeric proteinaceous nature. If this is done, the distinction between the preferred chemical modification of the protein and the formation of a protective coating is lost, for at least the surface of the protein is modified by interaction in the complex and the complex itself forms the coating. Thus it might be said that the most preferable embodiment of the invention involves a combination of chemical modification and surface coating. Where the proteinaceous particles are very small, or in the form of flakes, all of the protein may be involved in the protective complex; but it is thought that, with large particles, only the surface portion will be usually involved. The polymeric nature of the complex may be enhanced either by inducing acid-reversible cross-linking within the protein, or by employing a polymeric treatment agent which will interact with the protein surface and produce an acid unstable complex. Although the nature of the complex which is formed in a specific case may not be known, the suitability of the treatment can be gauged by simple solubility, ammonia accumulation after in vitro incubation in rumen fluid, and feeding tests.

One particularly preferred form of treatment involves the use of a protective complex which includes the polymeric reaction product of an aldehyde and the proteinaceous material. In general, the complex can be expected to include a polymer of formaldehyde, or a condensation product of formaldehyde, and amines or amides. A particularly simple and useful treatment results from the direct treatment of the proteinaceous feed material by a simple formaldehyde solution or paste as illustrated by examples 1 to 5 and 7 given below. In such treatment, the amines or amides will be derived from the protein itself so that the complex is formed by acid-reversible cross-links in the terminal amino groups of different proteins, or the E-amino groups of lysine, between the amide groups of asparagine and glutamine, between the guanidyl groups of arginine, between the imidazole groups of histidine, between the indole groups of tryptophan, or between any combination of these. Therefore, as might be expected, this direct treatment does not show promise in the protection of preparations of single amine acids; though these can, of course, be protected if they are incorporated in the formalinized protein.

Not only is it possible to formalin-treat proteins such as casein, which have been applied as a coating to the proteinaceous material which is to be protected, but it is also possible to form the formaldehyde polymer separately and to then apply it to the material to be protected. For example, urea formaldehyde, N-methylol polyacrylamide, melamine formaldehyde, or guanidine formaldehyde may be suitable and can be formed in situ or separately from the feed material. Other aldehydes, such as acetaldehyde or glutaraldehyde, or a saccharide such as sucrose, may be used, but appear to involve the so-called "browning reaction" which causes loss of essential amino acids, and therefore seem to be somewhat inferior to treatment with formaldehyde. The formaldehyde may be obtained in any one of the commercially available forms such as formalin solution, paraformaldehyde, "FORMCEL," etc.

As indicated above, and as illustrated by examples 1 to 5 and 7, the choice of proteinaceous feedstuffs is very wide, and variations in the suitability of one or another to formalin treatment can be expected. Consequently, it is not possible to quote optimum treatment conditions or processes which are widely applicable. The treatment is simple, however, and is illustrated by the above-mentioned examples. In general, the formaldehyde can be applied per medium of an aqueous solution or paste at concentrations of between 0.12 and 40 percent formaldehyde, and at temperatures of up to 120° C. but preferably at ambient temperatures. High temperatures may detract from the nutritional value of some of the more temperature-sensitive feeds as previously mentioned. The duration of treatment should be adjusted to suit the temperature and concentrations employed, but may vary from a few minutes to a few hours. Generally, the degree of protection afforded will be proportionate to pH, time, concentration and temperature The free formaldehyde may be removed after treatment by washing, or more simply, by heating.

Another preferred way of protecting the proteinaceous material from attack in the rumen by employing acid-soluble or acid-unstable complexes relies on the use of synthetic polymers or copolymers of basic acrylic or basic vinyl monomers. The desired properties can be approximated by regulating the number of chargeable nitrogen atoms in the polymer molecule and by controlling the proportions and types of copolymers employed. The desirable activity of the polymer with respect to the proteinaceous feed material can also be regulated by subsidiary monomeric residues.

More specifically, suitable basic polymers of amino acrylates or methacrylates are those of the following general formula:

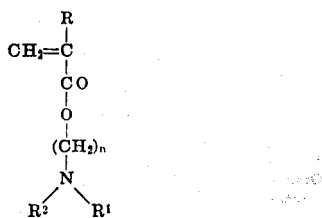

wherein: $R^1$=H or a normal or branched alkyl chain; $R^2$=H or a normal or branched alkyl chain; R=H or methyl; and n=2, 3 or 4. In particular polymers and copolymers of aminoethyl methacrylates are preferred, the most suitable polymers of this type known to the applicants being derived from poly (tertbutylaminoethyl methacrylate) and, to a lesser degree, poly (dimethylaminoethyl methacrylate).

The polymers or copolymers of basic vinyl monomers which show promise are those derived from vinyl monomers of the following general formula:

in which formula X is

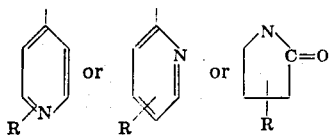

wherein R=H or alkyl.

Particular polymers or copolymers of interest in this group are those derived from poly (2-vinylpyridine), poly (4-vinylpyridine), and poly (N-vinylpyrrolidone).

A number of the polymers or copolymers included in the above groups have been made and characterized as described by Harrap, Rosman and Solomon (1965). As previously indicated, the relevant characteristics of the particular protein-polymer complex can be regulated to a large degree by the use of copolymers of other vinyl or acrylic monomers. Example 8 below, illustrates the effects of various proportions of copolymers and different homopolymers. The choice of such modifying monomers will be dependent on the degree of basicity provided—that is, the likely acid solubility—and upon the hydrophobic or hydrophilic properties—that is, the solubility under normal conditions. For example, styrene or substituted styrene, methacrylate or acrylate copolymers may be employed in this manner to regulate the hydrophobicity and basicity of the resultant polymeric complex. Those skilled in the art will also be able to control the molecular weights of the resultant polymers and copolymers to appropriately modify the properties of the coatings.

It should be appreciated that the above requirements for the polymers and copolymers can only be stated in general terms since these polymers have been selected to form complexes with the proteins being coated. In the case of the preferred poly (tertbutylaminoethyl methacrylate), when employed to coat casein, a polymeric protein complex is produced which is highly effective in resisting bacterial attack (example 8).

The use of polymers like those described above in conjunction with a formalin treatment is also envisaged by the present invention. Such combined treatments may be applied as a single or two-step process, but preferably involve the reaction product of a methylolation reaction between the polymer and the formalin according to the following general formula:

$$R-NH_2CH_2O : R-NH-CH_2-OH$$

The actual application of the protective treatment of the proteinaceous feed material may be performed in any suitable known manner, some of which have been illustrated in the examples. The use of a fluidized bed, coating from an emulsion, solution or paste, the formation of the protective coating in situ or separately, are all envisaged.

It is obviously desirable, given a particular protected feed or feed supplement, to reduce the residence time of that feed within the rumen. This may, in general, be achieved in two ways. Firstly, the particle size of the feed should be kept small and preferably between 0.1 and 1 millimeter in diameter, and the relative density should be near unity. Use of a particle size and density of this order reduces the chance of the feed being returned for rumination or being trapped by froth and retained within the rumen. Secondly, addition of up to 15 to 20 percent of salt to the diet will, largely through the resultant increase in water intake, greatly accelerate the passage of such particulate material through the rumen, making it possible to halve the normal residence times. Example 10 illustrates this effect, but the application of this process requires adequate water supplies.

While it has been emphasized, in accordance with the preferred embodiments of the invention, that best results can be obtained with a treatment agent which interacts with at least the protein surface to form a polymeric complex having the desired characteristics, it may be possible with improved coating techniques to apply a purely mechanical coating to the protein or amino acid which is essentially inert with respect thereto. It is, of course, characteristic of such coatings that their solubilities are substantially unchanged by their application to the protein or amino acids. The FIGURE shows wool growth rate and water consumption.

The invention will now be more fully described by means of the following illustrative examples:

EXAMPLE 1.

Several 250 Kg. lots of commercial HCl precipitated casein (<30 mesh) were stirred for 1 hour with 10 volumes of formalin solution prepared by mixing 1 volume of commercial formalin (40 percent formaldehyde) with 9 volumes of water. The casein was allowed to settle and the formalin solution decanted. The residue was stirred with 10 volumes of water, allowed to settle and the water decanted. This washing procedure was repeated once and the residue dried on trays in an oven at 80° C.

Samples of formalin-treated and untreated casein were incubated with 20 ml. rumen contents in vitro at 39.5° C. and the ammonia accumulation in the medium measured by distillation with saturated sodium borate solution and titration with 0.01N HCl. The ammonia accumulation after different periods of incubation is shown in table 1.

TABLE 1. IN VITRO INCUBATION OF FORMALINIZED CASEIN

[NH₃ accumulation above blank value after incubation (percent of nitrogen added)]

| Hours | 3 | 6 | 12 | 24 |
|---|---|---|---|---|
| Untreated casein | 10.4 | 73.6 | 82.5 | 89.2 |
| Formalinized casein | −0.6 | −0.4 | −0.6 | 1.1 |

The results in table 1 are corrected for the small amount of ammonia accumulation that occurs in the absence of added protein. The results indicate that the formalin treatment prevented breakdown of the treated casein by the microbes in the incubation flasks. The treated casein was recovered intact from the flasks, while the untreated casein had largely disappeared.

Similar results were obtained when a 60 g. sample of the treated casein was added to the rumen of a sheep through a fistula—there was no rise in ammonia concentration, whereas 60 g. of untreated casein caused the ammonia concentration to rise from 15 to 37 mg. N per 100 ml.

100 g. of treated casein were added to the daily ration of 8 sheep already receiving 400 g. of lucerne chaff and 400 g. of wheaten chaff. 4 sheep were maintained on the chaff diet alone which is sufficient to maintain the bodyweight constant. The wool growth rate and bodyweight of the sheep before and after the addition of treated casein to the diet is shown in table 2. Wool growth was measured from sample areas defined by tattoo lines on the midsides. Total wool growth rates in g. per day shown in table 2 were obtained by multiplying the weight of clean dry wool on the sample area by a factor representing the ratio of sample to total wool growth rates.

TABLE 2
[Wool growth and bodyweight (B.W.) response to formalin treated casein]

| Group and Sheep No. | Pre-treatment | | Weeks of treatment | | | | | |
|---|---|---|---|---|---|---|---|---|
| | | | 2-3 | | 4-5 | | 6-7 | |
| | Wool. g./day | B.W. kg. | Wool, g./day | B.W., kg. | Wool, g./day | B.W., kg. | Wool, g./day | B.W., kg. |
| Control: | | | | | | | | |
| 6016 | 8.1 | 55.8 | 7.4 | 55.4 | 6.8 | 55.2 | 6.9 | 54.6 |
| 6030 | 6.2 | 45.8 | 5.4 | 46.1 | 6.9 | 45.4 | 5.7 | 45.9 |
| 6033 | 6.2 | 52.0 | 4.8 | 52.1 | 5.8 | 51.8 | 4.8 | 51.8 |
| 6034 | 6.8 | 55.0 | 7.0 | 55.5 | 6.2 | 55.3 | 7.4 | 55.6 |
| Mean | 6.8 | 52.2 | 6.2 | 52.3 | 6.4 | 51.9 | 6.2 | 52.0 |
| Treated: | | | | | | | | |
| 6018 | 6.1 | 54.8 | 9.5 | 57.2 | 12.0 | 58.0 | 13.1 | 58.2 |
| 6024 | 5.9 | 56.4 | 7.4 | 57.4 | 7.9 | 58.3 | 8.1 | 59.1 |
| 6029 | 7.3 | 52.2 | 9.5 | 54.4 | 12.8 | 55.2 | 12.8 | 55.7 |
| 6031 | 7.2 | 53.2 | 8.6 | 54.8 | 10.4 | 55.0 | 10.4 | 55.6 |
| 6014 | 5.8 | 47.2 | 7.9 | 48.7 | 11.0 | 49.0 | 10.5 | 49.9 |
| 6020 | 5.5 | 57.0 | 6.5 | 59.2 | 8.9 | 60.5 | 7.8 | 61.2 |
| 6026 | 7.5 | 56.7 | 9.5 | 58.0 | 10.2 | 58.5 | 10.4 | 58.4 |
| 6036 | 8.0 | 44.5 | 9.8 | 46.7 | 13.8 | 48.0 | 13.6 | 49.3 |
| Mean | 6.7 | 52.6 | 8.6 | 54.6 | 10.9 | 55.3 | 10.8 | 55.9 |

The wool growth of the sheep receiving the treated casein was 74 percent above that of the control sheep after 7 weeks. Bodyweights also increased in the sheep receiving the treated casein. In other experiments, the addition of untreated casein to the same base diet increased wool growth by only 10–15 percent and produced no effect on bodyweight.

Blood samples were taken from 4 treated and the 4 control sheep 4 weeks after the change in diet. Analysis of the pooled samples for free amino acids by ion exchange chromatography gave the results shown in table 3.

TABLE 3

Amino Acids in Plasma of Sheep after Addition of Formalin-treated Casein to the Diet

| | Concentration mM | | |
|---|---|---|---|
| Amino Acid | Control | Treated | % Increase |
| Taurine | 0.01 | 0.020 | +100 |
| Urea | 0.366 | 0.542 | +48 |
| Aspartic Acid | 0.033 | 0.032 | −3 |
| Glutamic Acid | 0.059 | 0.050 | −15 |
| Proline | 0.092 | 0.280 | +204 |
| Citrulline | 0.166 | 0.234 | +41 |
| Glycine | 0.688 | 0.439 | −36 |
| Alanine | 0.220 | 0.173 | −21 |
| Valine | 0.107 | 0.244 | +128 |
| 1/2-Cystine | 0.014 | 0.037 | +164 |
| Methionine | 0.013 | 0.018 | +38 |
| Isoleucine | 0.055 | 0.084 | +53 |
| Leucine | 0.070 | 0.135 | +93 |
| Tyrosine | 0.060 | 0.082 | +37 |
| Phenylalanine | 0.032 | 0.046 | +44 |
| Ornithine | 0.106 | 0.125 | +18 |
| Lysine | 0.113 | 0.220 | +95 |
| Histidine | 0.112 | 0.112 | 0 |

Marked increases may be seen in the concentration of essential amino acids in the plasma of the sheep receiving formalin-treated casein in the diet. Similar changes in plasma amino acid concentration were observed when casein was infused directly into the abomasum.

100 g. of formalin-treated casein were also added to the daily ration of 15 sheep which received, in addition, 400 g. of lucerne chaff. Earlier the sheep were fed a diet comprising 250 g. lucerne chaff and 250 g. of mixed concentrate meal (wheat, oats, linseed meal and coconut meal). The effect on wool growth and bodyweight is shown in table 4.

TABLE 4
[Wool growth and bodyweight (B.W.) response to formalin treated casein]

| Sheep | Pre-treatment | | Weeks of treatment | | | | | |
|---|---|---|---|---|---|---|---|---|
| | | | 1-2 | | 3-4 | | 5-6 | |
| | Wool, g./day | B.W., kg. | Wool, g./day | B.W., kg. | Wool, g./day | B.W., kg. | Wool, g./day | B.W., kg. |
| FA30 | 3.6 | 37.6 | 3.4 | 36.9 | 5.2 | 36.9 | 3.8 | 37.2 |
| FA46 | 3.0 | 42.5 | 2.5 | 41.9 | 4.9 | 42.4 | 4.4 | 43.1 |
| FA70 | 3.3 | 36.5 | 3.1 | 36.6 | 5.7 | 37.2 | 5.0 | 37.5 |
| FA82 | 3.1 | 45.8 | 4.1 | 46.3 | 3.5 | 45.3 | 3.8 | 46.8 |
| FA84 | 2.1 | 39.6 | 3.6 | 40.7 | 5.3 | 41.3 | 5.1 | 41.1 |
| FA86 | 2.6 | 42.0 | 3.1 | 41.1 | 4.6 | 41.8 | 5.5 | 42.2 |
| 4078 | 2.2 | 44.8 | 3.3 | 45.7 | 4.8 | 46.6 | 5.5 | 46.5 |
| 4092 | 3.5 | 41.2 | 4.3 | 41.5 | 4.4 | 41.8 | 5.7 | 41.8 |
| 4093 | 2.1 | 42.8 | 3.8 | 43.2 | 4.4 | 43.6 | 5.0 | 44.2 |
| A665 | 2.4 | 32.9 | 3.3 | 32.7 | 3.1 | 32.5 | 2.8 | 32.6 |
| 5569 | 2.8 | 27.2 | 3.1 | 28.0 | 5.2 | 28.6 | 5.6 | 29.3 |
| 5577 | 4.6 | 38.2 | 5.3 | 39.2 | 7.2 | 39.8 | 8.3 | 40.2 |
| 5585 | 3.6 | 37.8 | 4.0 | 38.0 | 4.6 | 38.4 | 4.9 | 38.8 |
| 5590 | 3.0 | 38.1 | 3.2 | 37.6 | 3.6 | 38.9 | 4.7 | 39.4 |
| 5592 | 4.8 | 34.4 | 5.5 | 35.3 | 5.9 | 35.3 | 5.9 | 35.4 |

The wool growth of the sheep increased by 60.8 percent after 5-6 weeks. Prior to the commencement of treatment, wool growth had not varied by more than 10 percent during the preceding year. An increase in bodyweight was also produced by the treatment.

EXAMPLE 2.

The procedure for formalin treatment of casein described in example 1 was applied to 500 lb. lots of fish meal, peanut meal, cotton-seed meal, soya bean meal. The treatment caused the loss of some soluble material from these meals and a rise in crude protein percentage except for fish meal, in which case the crude protein percentage declined.

Samples of two of the treated meals were incubated with rumen contents in vitro to evaluate the degree of protection achieved against microbial degradation. The results for fish meal and peanut meal are shown in table 5.

TABLE 5.—IN VITRO INCUBATION OF FISH MEAL AND PEANUT MEAL TREATED WITH FORMALIN

[$NH_3$ Accumulation above blank value after incubation percent of nitrogen added]

| Hours | 3 | 6 | 10 | 24 |
|---|---|---|---|---|
| Untreated fish meal | 19.3 | 14.9 | 16.1 | 10.4 |
| Treated fish meal | −0.4 | −2.1 | −0.1 | −3.1 |
| Untreated peanut meal | 60.1 | 64.3 | 66.6 | 66.0 |
| Treated peanut meal | 0.9 | 1.4 | 3.3 | 2.3 |

It may be noted that untreated fish meal did not lead to much accumulation of ammonia in the culture medium owing to a natural resistance to microbial attack or to the use of the ammonia for microbial synthesis. However, with both meals formalin treatment substantially lowered the ammonia accumulation.

The treated meals were mixed with equal parts of lucerne chaff and pelleted. 500 g. per sheep per day of the pellets were fed to groups of 6 sheep on each diet, and wool growth rates compared with the rates measured earlier on similar diets containing the untreated meals.

TABLE 6

[Wool growth on diets containing Formalin protein-treated meals]

| Diet and Sheep No. | Wool growth g./day untreated diet | Wool growth g./day treated diet after 4-5 weeks | Percent change |
|---|---|---|---|
| Peanut meal: | | | |
| 6560 | 6.0 | 6.7 | |
| 6545 | 4.4 | 7.0 | |
| 6538 | 4.2 | 8.4 | |
| 6552 | 3.4 | 7.9 | |
| 6554 | 2.8 | 4.6 | |
| 6541 | 4.3 | 5.1 | |
| Mean | 4.2 | 6.6 | +57 |
| Soya bean meal: | | | |
| 6526 | 6.9 | 8.5 | |
| 6553 | 5.9 | 7.0 | |
| 6543 | 6.3 | 6.9 | |
| 6549 | 7.0 | 9.2 | |
| 6537 | 5.2 | 7.5 | |
| 6521 | 4.2 | 6.6 | |
| Mean | 5.9 | 7.6 | +29 |
| Cottonseed meal: | | | |
| 6562 | 8.4 | 8.5 | |
| 6528 | 7.4 | 7.0 | |
| 6542 | 7.2 | 6.2 | |
| 6548 | 5.6 | 7.0 | |
| 6532 | 6.2 | 6.2 | |
| 6519 | 5.4 | 6.6 | |
| Mean | 6.7 | 6.9 | +3 |
| Fish meal: | | | |
| 6559 | 8.5 | 5.3 | |
| 6533 | 7.7 | 5.8 | |
| 6540 | 7.8 | 5.3 | |
| 6558 | 6.7 | 4.5 | |
| 6550 | 8.3 | 6.4 | |
| 6524 | 4.5 | 3.0 | |
| Mean | 7.3 | 5.1 | −30 |

It may be seen that formalin treatment decreased the nutritive value of fish meal for wool growth, possibly due to the loss of soluble constituents during the washing process. The value of cottonseed meal was unchanged by the treatment, but the values for soya bean meal and peanut meal were considerably enhanced.

EXAMPLE 3.

In view of the variable wool growth responses obtained to the formalin treatment of different protein meals, the capacity of different proteins to stimulate wool growth when infused directly into the abomasum was measured.

Abomasal fistulae were established and the infusions made as described by Reis and Schinckel (1961).

The effects of abomasal infusion on wool growth and bodyweight are shown in table 7.

TABLE 7

[Increases in wool growth rate and bodyweight (B.W.) caused by infusion of different proteins into the abomasum]

| Protein | No. of sheep | Basal diet, g./day | Protein infusion rate, g./day | Wool growth rate 5-7 weeks, percent increase | B.W. increase after 7 weeks kg. |
|---|---|---|---|---|---|
| Casein | 3 | 800 | 60 | 148 | 4.5 |
| Gelatin | 1 | 800 | 60 | 20 | 3.0 |
| Blood meal | 2 | 400 | 62 | 31 | 2.4 |
| Fish meal | 1 | 800 | 83 | 47 | 4.0 |
| Soya bean meal | 1 | 800 | 80 | 27 | 4.9 |

These results show that the infusion of different proteins into the abomasum gives different wool growth and bodyweight responses, so that protection of different proteins against microbial attack by formalin treatment cannot be expected to give the same wool growth response. It may be noted that bodyweight increase was not proportional to the increase in wool growth rate. Additional wool growth responses were obtained when 1.5 to 3.0 g./day L-cysteine or DL-methionine were infused with casein or gelatin, indicating the importance of the amino acid composition of the protein infused.

EXAMPLE 4.

Formalin treatment, as described in example 1, has also been applied to fresh grass and clover and to lucerne chaff. In all cases, formalin treatment of the feedstuffs markedly reduced ammonia accumulation after incubation in vitro (table 8). Analysis of volatile fatty acids indicated that formalin treatment did not lower the fermentation of carbohydrate present in the feedstuffs.

TABLE 8

[In vitro incubation of fresh grass, legumes and lucerne chaff $NH_3$ accumulation above blank—% of N added]

| Hours | | 3 | 6 | 10 | 24 |
|---|---|---|---|---|---|
| Grass (*Kikuyu Pennisetum clandestinum*) | Untreated | 22.8 | 14.1 | −4.4 | −17.1 |
| | Treated | −0.9 | −9.0 | −14.9 | −47.4 |
| Subclover (*Trifolium subterraneum*) | Untreated | 12.9 | 8.5 | 6.9 | 12.6 |
| | Treated | −0.7 | −3.8 | −8.3 | −29.1 |
| Lucerne (*Medicago sativa*) | Untreated | 22.7 | 23.4 | 22.8 | 39.0 |
| | Treated | 2.6 | 0.8 | −3.1 | −9.7 |
| Lucerne chaff | Untreated | 9.3 | 4.7 | 7.5 | 11.0 |
| | Treated | −1.5 | −4.0 | −19.0 | −12.5 |

EXAMPLE 5

The procedure outlined in example 1 for the formalin treatment of casein involves the disadvantages of requiring a washing step and of extracting soluble constituents when applied to some protein rich feedstuffs. These disadvantages are overcome by adding only sufficient formalin solution to make a paste and effecting removal of free formaldehyde by the drying process.

Seven 50 g. samples of HCl precipitated casein were mixed with 3 volumes (w/v) of formalin solution containing 2.5%, 5%, 7.5%, 10%, 12.5%, 25% and 50% of commercial formalin respectively. After 1 hour at 20° C. the pastes were placed in an oven at 80° C. until a detectable odor of formaldehyde was no longer apparent.

The samples were then incubated in vitro in rumen fluid as described in example 1.

TABLE 9

[In vitro incubation of casein formalinized as a paste NH₃ accumulation above blank value after incubation (percent of nitrogen added)]

| Hours | 3 | 6 | 12 | 24 |
|---|---|---|---|---|
| Untreated casein | 40.4 | 73.6 | 82.5 | 89.2 |
| Formalin-treated, percent: | | | | |
| 2.5 | −0.2 | 0.2 | −0.1 | −0.1 |
| 5. | −0.4 | 0.0 | −0.6 | −2.4 |
| 7.5 | −0.2 | 0.0 | −2.2 | −4.7 |
| 10 | −0.6 | 0.0 | −1.9 | −5.8 |
| 12.5 | 0.0 | −1.3 | −2.9 | −3.7 |
| 25 | −1.0 | −3.0 | −6.2 | −9.3 |
| 50 | −4.3 | −11.0 | −20.3 | −28.4 |

A satisfactory degree of protection against microbial degradation was obtained by treatment of the casein with 2.5 percent formalin and even lower concentrations give satisfactory protection.

At the higher concentrations of formalin, ammonia accumulation was less than in the tubes to which no casein was added, indicating microbial inhibition due to the presence of free formaldehyde in the incubation medium.

EXAMPLE 6

Three vegetable tannin preparations were evaluated for their capacity to render protein resistant to microbial degradation in the rumen. The tannin preparations were Quebracho (from the wood of Quebracho colarado), Myrobalans (fruit of Terminalia chebula) and Chestnut (wood of Castanea vesca). 5 kg. of HCl precipitated casein (<30 mesh) was mixed with 15 percent by weight of powdered tannin and 3 volumes of water added. The mixture was stirred to form a homogeneous paste and then left for 16 hours at room temperature. The paste was then dried in the oven at 70°–80° C.

Samples of the dried material were added to flasks containing rumen contents and incubated for 24 hours as described under example 1.

TABLE 10

In vitro incubation of Casein treated with Vegetable Tannins
NH₃ Accumulation above Blank Value after Incubation
(% of nitrogen added)

| | 3 hr. | 6 hr. | 10 hr. | 24 hr. |
|---|---|---|---|---|
| Untreated casein | 25.7 | 51.6 | 71.0 | 81.1 |
| Quebracho-treated casein | 25.1 | 48.1 | 67.0 | 74.7 |
| Myrobalans-treated casein | 22.6 | 44.2 | 63.1 | 79.3 |
| Chestnut-treated casein | 23.0 | 46.8 | 60.9 | 69.3 |

It may be seen from table 10 that treatment of casein with vegetable tannins effected only a slight reduction in microbial breakdown of the casein.

When a sheep was fed on a diet containing 70 g. of the Myrobalans tannin-treated casein plus 400 g. of equal parts of lucerne and wheaten chaff, the diet was eaten for 1 day, and then refused by the sheep. A second sheep accepted a similar diet containing the Quebracho tannin, but no increase in wool growth was observed. A sheep fed a similar diet containing Chestnut tannin also refused its feed after 1 day.

EXAMPLE 7.

The aldehydes, glyoxal and glutaraldehyde, and the disaccharide sucrose, were also evaluated as means of rendering protein resistant to microbial breakdown in the rumen.

Separate samples of HCl precipitated casein (<30 mesh) were stirred with 10 volumes of 30 percent glyoxal and with various concentrations of glutaraldehyde respectively for 1 hour. The casein was then allowed to settle and the solution decanted, the residue washed twice with water and then dried at 80° C. A sample of casein was also mixed with an equal weight of sucrose and the mixture stirred with one volume of water. The mixture was dried in the oven at 80° C., washed with water and redried.

The dried casein produced from the above reactions was brown in color, indicating possible loss of amino acids, particularly lysine, from the browning reaction. (The formalin-treated casein remained white). The treated samples were incubated in vitro as described in example 1.

TABLE 11

In Vitro Incubation of Casein Treated with Glyoxal
Glutaraldehyde or Sucrose(NH₃ Accumulation above
Blank Value after Incubation (% nitrogen added)

| | 3 hr. | 6 hr. | 12 hr. | 24 hr. |
|---|---|---|---|---|
| Untreated casein | 43.2 | 78.4 | 90.7 | 89.8 |
| 30% glyoxal-treated casein | 31.3 | 71.0 | 87.7 | 86.1 |
| 1% glutaraldehyde-treated casein | −0.2 | −0.1 | −0.1 | 2.7 |
| 3.125% glutaraldehyde-treated casein | −0.8 | −0.8 | −0.2 | −0.4 |
| 6.25% glutaraldehyde-treated casein | −0.8 | −0.4 | 0.0 | 0.4 |
| 12.5% glutaraldehyde-treated casein | −1.0 | −0.8 | 0.2 | −0.2 |
| 25% glutaraldehyde-treated casein | −1.3 | −0.4 | 0.2 | 0.6 |
| Sucrose-treated casein | 2.1 | 5.8 | 12.9 | 23.9 |

The glyoxal-treated casein may be seen to be only slightly protected from microbial degradation, while glutaraldehyde treatment rendered the casein immune to microbial action. Considerable protection was obtained with sucrose-treated casein.

Sheep were fed on diets containing 1 percent glutaraldehyde and sucrose-treated casein respectively. Preliminary observations indicate a smaller increase in wool growth than that produced by adding formalin-treated casein to the diet. Although the treated casein was protected from microbial attack in the rumen, the treatment may not have substantially increased the absorption of limiting essential amino acids from the small intestine.

EXAMPLE 8

The use of polybasic polymers to protect protein from microbial attack has also been investigated. Samples of HCl precipitated casein were coated with various polymers and the rate of solution of the coated protein at pH 6.0 measured using a flow cell monitored at 280 mμ. The polymers were prepared and characterized as described by Harrap, Rosman and Solomon (1965) and comprised the following:
1. Poly (N-vinylpyrrolidone)
2. N-vinylpyrrolidone-styrene (50:50) copolymer
3. N-vinylpyrrolidone-styrene (75:25) copolymer
4. Poly (2-vinylpyridine)
5. 2-vinylpyridine-styrene (50:50) copolymer
6. 2-vinylpyridine-styrene (2-vinylpyridine) 75:25) copolymer
7. Poly (tert-butylaminoethyl methacrylate)
8. Tert-butylaminoethyl methacrylate-styrene (50:50) copolymer
9. Tert-butylaminoethyl methacrylate-styrene (75:25) copolymer
10. Poly (4-vinylpyridine)
11. 4-vinylpyridine-styrene (50:50) copolymer
12. 4-vinylpyridine-styrene (75:25) copolymer Polymer No. 7 (poly (tert-butylaminoethyl methacrylate) and, to a lesser extent Nos. 4 and 10, were found to render casein insoluble at pH6. Samples of acid precipitated casein (30–40 mesh) were treated with 48 percent of their weight of polymers Nos. 7 and 12 dissolved in 10 percent (w/v) methylethyl ketone. (20 percent of polymer No. 7 was found sufficient to make casein insoluble at pH6.0). The samples were dried and then incubated with rumen contents in vitro as described in example 1. The results are shown in table 12.

TABLE 12

In Vitro Incubation of Casein treated with Polybasic Polymers NH₃ Accumulation above blank value—% of N added as Casein

|  | 3 hr. | 6 hr. | 12 hr | 24 hr. |
|---|---|---|---|---|
| Untreated casein | 21.2 | 46.2 | 76.5 | 88.0 |
| Casein treated with polymer 7 | 2.7 | 7.9 | 6.0 | 5.4 |
| Casein treated with polymer 9 | 29.0 | 44.7 | 54.7 | 62.2 |
| Polymer 7 | −0.9 | −4.1 | −13.5 | −21.7 |

Polymer No. 7 (poly (tert-butylaminoethyl methacrylate)) protected casein against microbial attack, while the copolymer with styrene (polymer No. 12) was less effective. Polymer No. 7 added alone to the incubation flash decreased ammonia accumulation levels below the blank. This effect was shown to be associated with a toxic action on the microbes. Some protozoa burst when the polymer was added to suspensions of microbes in rumen fluid and the motility of others was markedly reduced. No such action was observed when casein treated with the same polymer was added to a suspension of rumen microbes.

EXAMPLE 9.

This example illustrates the use of the formalin treatment to protect the amino acid methionine from metabolism in the rumen. The same procedures may be applied to cystine and other amino acids. We have shown that the infusion of cysteine or methionine into the abomasum causes a substantial increase in wool growth. (Reis and Schinckel, 1963).

One g. samples of methionine were coated with an aqueous solution containing 5 g. of calcium caseinate (Casinal-Glaxo). After drying at 80° C. the coated methionine was then treated with formalin as a paste using 10 percent formalin as in example 5. Control tubes with methionine and formalin-treated casein added separately were also prepared. The preparations were then incubated with rumen contents in vitro, and the concentration of methionine in the incubation fluid after precipitation of the microbes and proteins with 0.1 N sulfuric acid was measured by high voltage paper electrophoresis (table 13).

TABLE 13

Methionine recovered in Incubation Fluid % of Methionine Added

|  | 3 hr. | 6 hr. | 12 hr. | 24 hr. |
|---|---|---|---|---|
| Methionine | 93 | 93 | 81 | 67 |
| Casein-coated methionine formalin-treated | 53 | 52 | 62 | 62 |
| Methionine + casein treated with formalin | 100 | 92 | 87 | 60 |

It may be seen that coating methionine with casein and subsequent treatment with formalin reduced the solution of methionine in the incubation fluid.

EXAMPLE 10.

This example illustrates the effect on wool growth of increasing water consumption by the addition of salt to the diet. A sheep was fed a diet containing 180 g. of protein in linseed meal and 20 percent of salt. The FIGURE shows wool growth rate and water consumption.

The residence time of ingesta in the rumen was decreased with increasing water intake, and the results confirm the theories on which our invention is based Full details of the References given in the foregoing specification are as follows:
HARRAP, B. S., ROSMAN, R. E. & SOLOMON, D. H. (1965).
J. Appl. Polymer Sci., 9: 535
REIS, P J. & SCHINCKEL, P. G. (1961). Aust. J. agric. Res., 12: 335.
REIS, P. J. & SCHINCKEL, P. G. (1963). Aust J. biol. Sci., 16: 218.
REIS, P. J. & SCHINCKEL, P. G. (1964). Aust J. biol. Sci., 17: 532.

What we claim is:

1. A feedstuff for ruminant animals comprising a particulate proteinaceous feed material selected from the group consisting of plant materials, animal materials, synthetic materials and mixtures thereof characterized by coating said materials with a member selected from the group consisting of protein-aldehyde complexes and polymeric materials selected from the group consisting of polymers of basic amino acrylate and methacrylate basic vinyl monomers and copolymers thereof, said coating being in an amount sufficient to render at least the surface of the particles of proteinaceous feed material relative stable in solutions having pH values greater than about 5 so as to protect the material from microbial attack in the rumen of the animal while leaving said material unstable in acid solutions having a pH of less than about 4, whereby said material remains susceptible to breakdown and digestion within the abomasum and small intestine of the animal.

2. A feedstuff as claimed in claim 1, wherein a protein-aldehyde complex is employed.

3. A feedstuff as claimed in claim 1, characterized in that the surface of said particles comprises a polymeric material selected from the group consisting of polymers of basic amino acrylate and methacrylate, basic vinyl monomers, and copolymers thereof.

4. A feedstuff according to claim 2 wherein the aldehyde is formaldehyde.

5. A feedstuff as claimed in claim 2, characterized in that said polymeric material is selected from the group consisting of polymers and copolymers of monomers of the general formula:

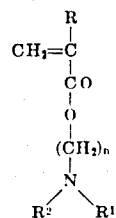

wherein R is selected from the group consisting of hydrogen and methyl; R¹ and R² are each independently selected from the group consisting of hydrogen atoms, normal and branched chain alkyl radicals; and n is an integer of from 2 to 4, inclusive.

6. A feedstuff as claimed in claim 3, characterized in that said polymeric material is selected from the group consisting of polymers and copolymers of monomers of the general formula:

wherein X is a radical selected from the group consisting of

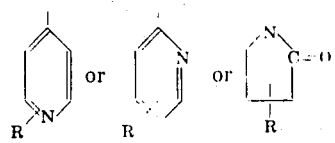

wherein R is selected from the group consisting of hydrogen and alkyl.

7. A feedstuff as claimed in claim 5, characterized in that said polymeric material is selected from the group consisting of poly (tert.-butylaminoethyl methacrylate) and poly (dimethylaminoethyl methacrylate).

8. A feedstuff as claimed in claim 5, characterized in that said polymeric material is methylolated.

9. A feedstuff as claimed in claim 6, characterized in that said polymeric material is methylolated.

10. A process for the manufacture of proteinaceous feed materials for ruminant animals, which comprises coating a proteinaceous feed material with a member selected from the group consisting of protein-aldehyde complexes and polymeric materials selected from the group consisting of polymers of basic amino acrylate and methacrylate, basic vinyl monomers and copolymers thereof, in an amount sufficient to render the surface of the proteinaceous feed material relatively stable in solutions having pH values of greater than about 5 so as to protect the material from microbial attack in the rumen of the animal while leaving said material unstable in acid solutions having a pH of less than about 4 whereby said material remains susceptible to breakdown and digestion within the abomasum and small intestine of the animal.

11. A method as claimed in claim 10, characterized in that the surface of the proteinaceous feed material is coated by subjecting it to chemical modification with an aldehyde by treating the surface of said material with said aldehyde.

12. A method as claimed in claim 11, characterized in that said aldehyde is formaldehyde.

13. A method as claimed in claim 10, characterized in that particles of said material are coated with a polymer, selected from the group consisting of polymers of basic amino acrylate and methacrylate, basic vinyl monomers, and copolymers thereof.

14. A method as claimed in claim 13, characterized in that said polymer is selected from the group consisting of polymers and copolymers of monomers of the general formula:

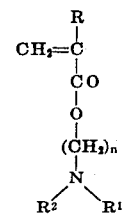

wherein R is selected from the group consisting of hydrogen and methyl; $R^1$ and $R^2$ are each independently selected from the group consisting of hydrogen atoms, normal and branched chain alkyl radicals; and $n$ is an integer of from 2 to 4, inclusive.

15. A method as claimed in claim 14, characterized in that said polymer is selected from the group consisting of poly-(tert-butylaminoethyl methacrylate) and poly (dimethylaminoethyl methacrylate).

16. A method as claimed in claim 14, comprising the step of treating the coated particles with an aldehyde to thereby methylolate the polymeric coating.

17. A method as claimed in claim 13, characterized in that said polymer is selected from the group consisting of polymers and copolymers of monomers of the general formula:

$$CH_2=CH$$
$$|$$
$$X$$

wherein X is a radical selected from the group consisting of

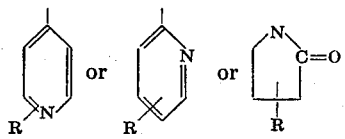

18. A method as claimed in claim 17, comprising the step of treating the coated particles with an aldehyde to thereby methylolate the polymeric coating.

19. A method of feeding ruminant animals which comprises feeding such animals the feedstuff of claim 1.

* * * * *

UNITED STATES PATENT OFFICE
CERTIFICATE OF CORRECTION

Patent No. 3,619,200            Dated Nov. 9, 1971

Inventor(s) KENNETH ADIE FERGUSON and DAVID HENRY SOLOMON

It is certified that error appears in the above-identified patent and that said Letters Patent are hereby corrected as shown below:

In the Specification:

Col. 12, line 73, change "12" to -- 9 --;

Col. 13, line 21, change "12" to -- 9 --.

Signed and sealed this 2nd day of April 1974.

(SEAL)
Attest:

EDWARD M. FLETCHER, JR.          C. MARSHALL DANN
Attesting Officer                  Commissioner of Patents